(12) United States Patent
Nakayama

(10) Patent No.: US 8,077,225 B2
(45) Date of Patent: Dec. 13, 2011

(54) IMAGE PICKUP APPARATUS

(75) Inventor: Satoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 12/337,710

(22) Filed: Dec. 18, 2008

(65) Prior Publication Data

US 2009/0167896 A1 Jul. 2, 2009

(30) Foreign Application Priority Data

Dec. 28, 2007 (JP) ................................. 2007-338412

(51) Int. Cl.
*H04N 5/262* (2006.01)
(52) U.S. Cl. ................. 348/240.1; 348/240.2; 348/240.3
(58) Field of Classification Search ........... 348/240.1–3, 348/E5.051, 240.99
See application file for complete search history.

(56) References Cited

U.S. PATENT DOCUMENTS

| | | | | |
|---|---|---|---|---|
| 5,227,824 A | * | 7/1993 | Yoshida et al. ................. | 396/60 |
| 5,867,217 A | * | 2/1999 | Okino et al. ............. | 348/240.99 |
| 6,489,993 B1 | * | 12/2002 | Sato et al. .................. | 348/240.3 |
| 7,773,129 B2 | * | 8/2010 | Ueda et al. ................. | 348/240.3 |
| 2007/0046783 A1 | * | 3/2007 | Shimada .................. | 348/208.99 |
| 2007/0053068 A1 | * | 3/2007 | Yamamoto et al. ........... | 359/676 |
| 2007/0120988 A1 | * | 5/2007 | Akiyama et al. ......... | 348/240.99 |

FOREIGN PATENT DOCUMENTS

| | | |
|---|---|---|
| JP | 2000-184259 | 6/2000 |
| JP | 3593271 | 11/2004 |

* cited by examiner

*Primary Examiner* — Tuan Ho
*Assistant Examiner* — Shahbaz Nazrul
(74) *Attorney, Agent, or Firm* — Cowan, Liebowitz & Latman, P.C.

(57) ABSTRACT

An image pickup apparatus includes optical and electronic zooming units, and a controller configured to control an operation of the electronic zooming unit. When the first aspect ratio is selected, the controller operates the electronic zooming unit along with an operation of the optical zooming unit between a first zoom state and a second zoom state that is closer to a telephoto end than the first zoom state. When the second aspect ratio is selected, the controller does not operate the electronic zooming unit between the first zoom state and a third zoom state that is located between the first zoom state and the second zoom state, and operates the electronic zooming unit along with the operation of the optical zooming unit between the second zoom state and the third zoom state.

4 Claims, 6 Drawing Sheets

TELEPHOTO END

LINE NUMBER = 480

WIDE-ANGLE END — IMAGE STABILIZATION REQUIREMENT RANGE

LINE NUMBER = 1200

TELEPHOTO END — IMAGE STABILIZATION REQUIREMENT RANGE

LINE NUMBER = 480

IMAGE PICKUP APPARATUS

BACKGROUND OF THE INVENTION

1. Field of the Invention

The present invention relates to an image pickup apparatus having an optical zooming function and an electronic zooming function.

2. Description of the Related Art

An image pickup apparatus, such as a video camera, is required for a high magnification zooming function for telephotographing. In order to realize the high magnification zooming that is unavailable only with the optical zooming, many image pickup apparatuses combine the optical zooming with electronic zooming that provides an electronic enlargement process of a part of a signal (image) from an image sensor.

For example, an image pickup apparatus disclosed in Japanese Patent No. 3,593,271 uses electronic zooming to increase an enlargement ratio at the wide-angle side, and selects optical zooming so as to increase the enlargement ratio after a predetermined enlargement ratio is obtained.

In addition, an image pickup apparatus generally provides an imaging aspect ratio of 16:9 instead of the conventional aspect ratio of 4:3. The image pickup apparatuses of this type often enable a user to select the imaging aspect ratio between 4:3 and 16:9.

In general, it is more effective for a good image quality to cut out more pixels or lines from all effective pixels of the image sensor, to reduce the cut images, and to output the reduced image to a monitor. However, in the telephotographing, the conventional image pickup apparatus preferentially uses the electronic zooming rather than the optical zooming to increase the enlargement ratio. The number of lines in the image output to the monitor when the optical zoom is being used is the same as that cut from the image sensor. In other words, in the telephotographing using the optical zooming, the line number cut from the image sensor satisfies the monitor's line number but the image quality of the output image degrades since the cutout line number is small. In addition, since the cutout line number from the image sensor changes when the imaging aspect ratio is switched, a relationship between the image quality and the imaging magnification changes due to the imaging aspect ratio.

SUMMARY OF THE INVENTION

The present invention is directed to an image pickup apparatus that combines optical zooming with electronic zooming, realizes a high magnification zooming function, and provides an output image having a good image quality irrespective of an aspect ratio, and its control method.

An image pickup apparatus according to one aspect of the present invention includes an optical zooming unit configured to provide an optical magnification variation, an image sensor configured to convert an optical image into an electronic signal, an electronic zooming unit configured to provide an electronic magnification variation using a signal from the image sensor, a controller configured to control an operation of the electronic zooming unit, and an selector configured to select an aspect ratio of an output image between a first aspect ratio and a second aspect ratio, wherein when the first aspect ratio is selected, the controller operates the electronic zooming unit along with an operation of the optical zooming unit between a first zoom state and a second zoom state that is closer to a telephoto end than the first zoom state, and wherein when the second aspect ratio is selected, the controller does not operate the electronic zooming unit between the first zoom state and a third zoom state that is located between the first zoom state and the second zoom state, and operates the electronic zooming unit along with the operation of the optical zooming unit between the second zoom state and the third zoom state.

A zoom control method according to another aspect of the present invention for an image pickup apparatus that includes an optical zooming unit configured to provide an optical magnification variation, an image sensor configured to convert an optical image into an electronic signal, an electronic zooming unit configured to provide an electronic magnification variation using a signal from the image sensor, and an selector configured to select an aspect ratio of an output image between a first aspect ratio and a second aspect ratio includes the steps of detecting the aspect ratio selected by the selector, operating, when the first aspect ratio is selected, the electronic zooming unit along with an operation of the optical zooming unit between a first zoom state and a second zoom state that is closer to a telephoto end than the first zoom state, and operating, when the second aspect ratio is selected, the electronic zooming unit between the first zoom state and a third zoom state that is located between the first zoom state and the second zoom state, and operating the electronic zooming unit between the second zoom state and the third zoom state along with the operation of the optical zooming unit.

Further features of the present invention will become apparent from the following description of exemplary embodiments with reference to the attached drawings.

DESCRIPTION OF THE EMBODIMENTS

A description will be given of an embodiment of the present invention with reference to the accompanying drawings.

Figure 1:
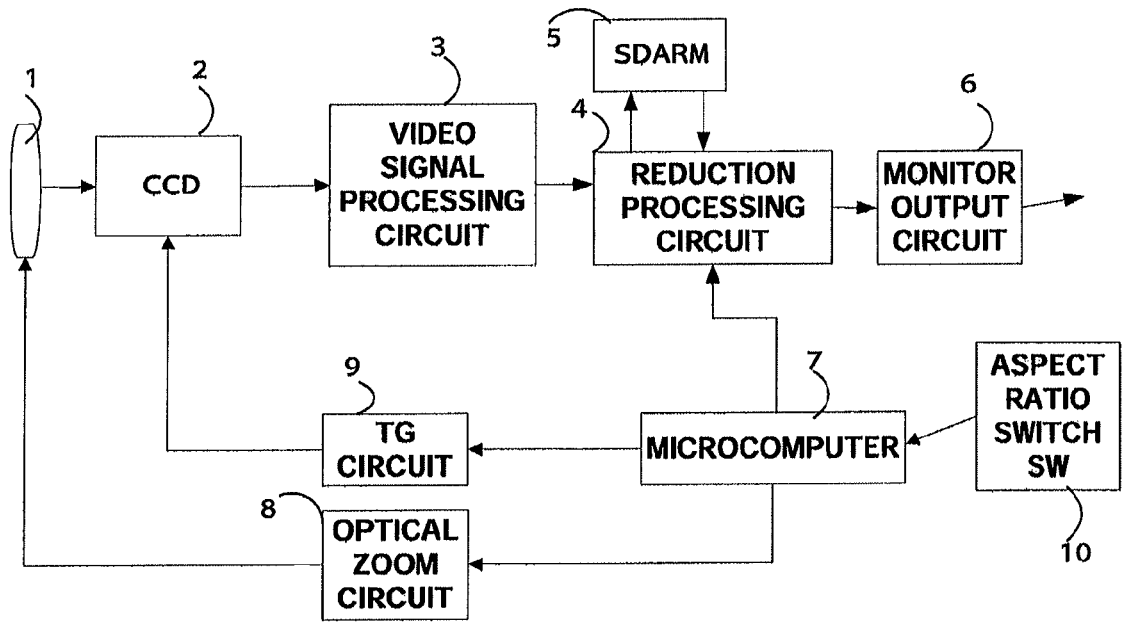
FIG. 1 is a block diagram showing a structure of a video camera according to an embodiment of the present invention.

FIG. 1 shows an electric structure of a video camera (image pickup apparatus) according to this embodiment of the present invention. 1 denotes an optical zoom lens as an image pickup lens, which provides an optical magnification variation. 2 denotes an image sensor that converts an optical image (subject image) formed by the optical zoom lens 1 into an electric signal. This embodiment uses a CCD sensor for the image sensor 2.

3 denotes a video signal processing circuit that generates a video signal (input image) by performing a video signal process according to a video standard, such as the NTSC, for a pixel signal (electric charge) output from the image sensor 2.

4 denotes a reduction processing circuit that performs the following reduction process for a video signal from the video from the video signal processing circuit.

5 denotes a SDRAM configured to temporally store a video signal in the reduction process for the video signal, and 6 denotes a monitor output circuit that outputs to a monitor (not shown) an output image as the video signal that has undergone the reduction process.

9 denotes a TG circuit that generates a drive signal in a horizontal direction and a vertical direction of the image sensor 2 according to a signal from the microcomputer, which will be described later.

7 denotes a microcomputer that serves as a controller configured to control the whole operation of the video camera.

8 denotes an optical zoom circuit that makes the optical zoom lens 1 perform optical zooming according to the signal from the microcomputer 7. The optical zoom circuit 8 and the optical zoom lens 1 constitute an optical zooming unit.

10 denotes an aspect ratio switch manipulated by a user so that the user can arbitrarily select an imaging aspect ratio. According to the manipulation of the aspect ratio switch 10, the imaging aspect ratio can be switched between a first aspect ratio of 16:9 and a second aspect ratio of 4:3.

A detailed description will now be given of structures for the electronic zooming and the optical zooming. This embodiment describes that a video signal (output image) output to the monitor has longitudinal 480 lines according to the NTSC standard.

The subject image formed by the optical zoom lens 1 is converted into an electric signal by the image sensor 2, and a pixel signal from the image sensor 2 is input into the video signal processing circuit 3.

The video signal processing circuit 3 performs a white balance process that makes a tint of color of an image to a color memorized by a human, a nonlinear signal process, such as a gamma process, and an outline emphasis process that adds the resolution sense to the image. The video signal generated by these video signal processes is input into the reduction processing circuit 4.

The TG circuit 7 outputs a drive signal to the image sensor 2 so that a signal that corresponds to the predetermined number of pixel lines in the horizontal direction of the image sensor 2 can be read out. A maximum value of the readout line number is determined by an upper limit value of the driving frequency of the image sensor 2. Where the imaging aspect ratio of 4:3 is set, this embodiment can read out a pixel signal from 1200 pixel lines (whole effective pixel area) as the maximum pixel line number.

The SDRAM 5 stores a video signal (input image) generated based on the pixel signal from the 1200 pixel lines by the video signal processing circuit 3.

The reduction processing circuit 4 cuts out a cutout range (first range) according to the electronic zoom magnification from the video signal (input image) stored in the SDRAM 5. Moreover, the reduction processing circuit 4 generates an output image having 480 pixel lines that can be video-output, from the cutout video signal, and outputs this output image to the monitor output circuit 6. At this time, the SDRAM 5 is used as a field memory or a line memory. The reduction process refers to a series of operations from cutting out of the cutout range to a generation of the output image.

The monitor output circuit 6 converts the video signal that has undergone the reduction process, into an analog signal, and outputs the analog signal to the monitor (not shown).

In enlarging an image to be output from the monitor output circuit 6 to the monitor, the microcomputer 7 outputs to the optical zoom circuit 8 a control signal configured to move the optical zoom lens 1 to the telephoto side. Thereby, the optical zooming is performed to the enlargement side. In addition, the microcomputer 7 determines the cutout range from the input image, and determines a reduction ratio corresponding to the cutout range according to the zoom position of the optical zoom lens 1 (a position of a magnification-varying lens (not shown), which will be referred to as an "optical zoom position" hereinafter). Thereby, the electronic zooming using the pixel signal from the image sensor 2 is performed to the enlargement side. The reduction process circuit 4 corresponds to the electronic zooming unit.

Where the imaging aspect ratio is 16:9, this embodiment performs the electronic zooming along with or connected to the optical zooming in the whole zoom region from the wide-angle end (first zoom state) to a higher magnification side or the telephoto end (second zoom state) at the telephoto side.

On the other hand, when 4:3 is selected by the aspect ratio switch 10, the optical zooming is performed in the wide-angle side zoom region from the wide-angle end to the middle zoom position (third zoom state), but no electronic zooming is performed. However, the electronic zooming is performed along with the optical zooming in a telephoto-side zoom region from the middle zoom position to the telephoto end.

Referring now to FIGS. 2 to 5, a description will be given of a size of the cutout range that is cut out from the input image from the electronic zooming. This embodiment provides electronic zooming that is an electronic magnification variation of an output image by changing a size of the cutout range (cutout size) from the input image that is generated by using the image sensor 2. In addition, the cutout size from the input image differs from the imaging aspect ratio. The outermost thick frame in FIGS. 2 to 5 denotes an input image including the aforementioned 1200 pixel lines, and a dotted line denotes the following image stabilization requirement range.

Figure 2:
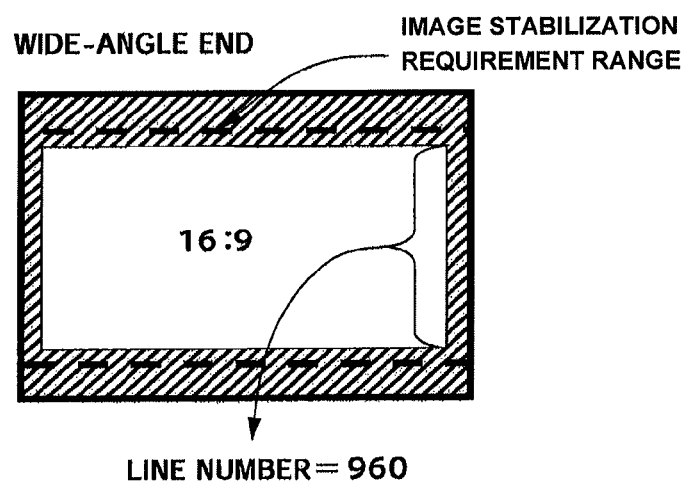
FIG. 2 is a view showing an imaging aspect ratio of 16:9 and a cutout range at a wide-angle end according to the embodiment.

FIG. 2 shows the maximum cutout size (the size of the cutout range) after the image stabilization requirement range is secured as a shiftable range that permits an electronic image stabilization process, where the imaging aspect ratio is 16:9. In other words, the reduction process circuit 4 sets the cutout range such that the image stabilization requiring range (second range) can be left outside the cutout range in the input image.

The electronic image stabilization process is a process that electronically reduces the image vibration by shifting the laterally and longitudinally the cutout range in the input image within the image stabilization requirement range according to the vibration of the video camera, such as a manual vibration. This electronic image stabilization process is performed as a result of that the reduction process circuit 4 shifts the cutout range, according to the instruction from the microcomputer 7 that detects the vibration of the video camera. In other words, the reduction processing circuit 4 corresponds to an image stabilization unit.

The vibration of the video camera may be detected by using a vibration detector (not shown), such as an angular speed sensor and an acceleration sensor, provided to the image pickup apparatus, or by calculating a motion vector by the pattern matching process between continuous frames of the input image.

As shown in FIG. 2, when the image stabilization requirement range is secured outside the cutout range, the number of pixel lines included in the cutout range (which will be referred to as a "cutout line number" hereinafter) is limited to 960. Therefore, where the imaging aspect ratio is 16:9, a cutout range corresponding to 960 cutout lines is the widest cutout range and provides the best image quality. This cutout range is adopted at the wide-angle end with the imaging aspect ratio of 16:9.

Figure 3:
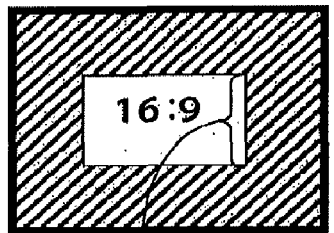
FIG. 3 is a view showing an imaging aspect ratio of 16:9 and a cutout range at a telephoto end according to the embodiment.

FIG. 3 shows the minimum cutout size when the imaging aspect ratio is 16:9. This minimum cutout size corresponds to 480 pixel lines equal to the vertical pixel line number of the NTSC standard. This cutout range is adopted at the telephoto end with the imaging aspect ratio of 16:9. Thus, the enlargement process is unnecessary for the cutout image by setting the cutout size to one corresponding to 480 pixel lines, and the deterioration of the image quality which would otherwise be caused by the enlargement process can be prevented. In addition, the imaging magnification can be maintained larger.

Figure 4:
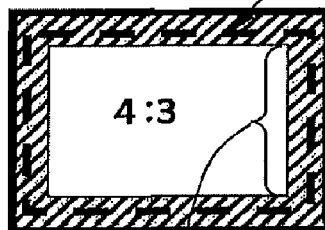
FIG. 4 is a view showing an imaging aspect ratio of 4:3 and a cutout range at a wide-angle end according to the embodiment.

FIG. 4 shows the maximum cutout size when the image stabilization requirement range is secured, where the imaging aspect ratio is 4:3. As described above, the input image has the maximum cuttable range corresponding to 1200 pixel lines. Therefore, the maximum cutout size with the imaging aspect ratio of 4:3 to the maximum cuttable range is limited, as shown in FIG. 4.

Where the imaging aspect ratio is 16:9, as described above, the maximum cutout size is restricted so as to leave the image stabilization requirement range. However, where the imaging aspect ratio is 4:3, the image stabilization requiring range has a latitude but the maximum cutout size is limited from the maximum cuttable range determined by one field of the readable pixel number according to a readout clock of the image sensor. This embodiment uses this cutout range at the wide-angle end with the imaging aspect ratio of 4:3.

Figure 5:
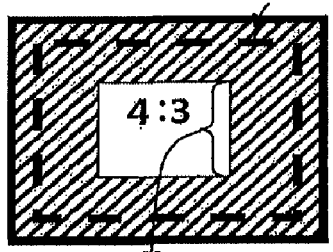
FIG. 5 is a view showing an imaging aspect ratio of 4:3 and a cutout range at a telephoto end according to the embodiment.

FIG. 5 shows the minimum cutout size where the imaging aspect ratio is 4:3. This minimum cutout size corresponds to 480 pixel lines equal to the vertical pixel line number of the NTSC standard for the aforementioned reason, similar to that when the imaging aspect ratio is 16:9. Thus, this cutout range is employed at the telephoto end with the imaging aspect ratio of 4:3.

Figure 6:
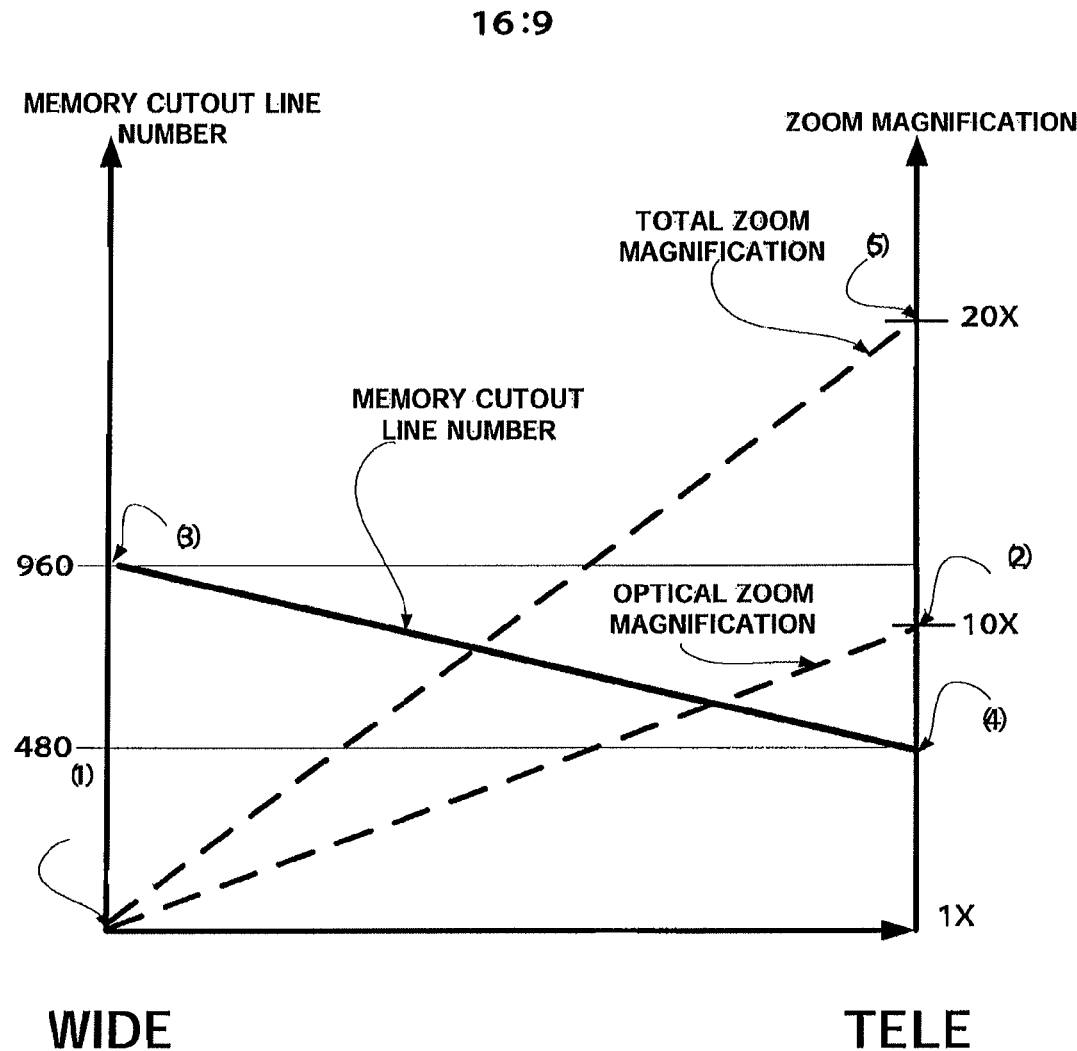
FIG. 6 is a view showing zooming with the imaging aspect ratio of 16:9 according to the embodiment.

FIG. 6 shows zooming when the imaging aspect ratio is 16:9 in this embodiment. In FIG. 6, the abscissa axis denotes a zoom position, the left end denotes a wide-angle end (WIDE), and the right end denotes a telephoto end (TELE). A right ordinate axis in FIG. 6 denotes the optical zoom magnification, the electronic zoom magnification, and the composite, total zoom magnification where the optical zoom magnification is variable from once to 10 times. In addition, a left ordinate axis denotes the memory cutout number as the vertical pixel line number of the cutout range. Here, the electronic zoom magnification is variable from a magnification corresponding to 960 memory cutout lines to a magnification corresponding to 480 memory cutout lines.

The memory cutout line number is a number that determines the pixel line number in the cutout range used to generate the output image in generating the output image having 480 pixel lines that can be video-output in the reduction process circuit 4.

In FIG. 6, the dotted line connecting points (1) and (2) denotes changes of the optical zoom magnifications, and the solid line connecting points (3) and (4) denote changes of the memory cutout line numbers.

In zooming from the wide-angle end to the telephoto end, the optical zoom magnification gradually increases from the point (1) at the wide-angle end to the point (2) at the telephoto end. On the other hand, the memory cutout line number gradually decreases from the point (3) of 960 lines, and reaches the point (4) having 480 lines at the telephoto end. Thus, the electronic zoom magnification in this embodiment linearly changes with a change of the optical zoom magnification in the whole zoom region from the wide-angle end to the telephoto end. Since the maximum memory cutout line number is 960 and the minimum memory cutout line number is 480, the electronic zoom magnification changes between once and twice. In addition, since the maximum optical zoom magnification is 10 times, the total maximum zoom magnification is 20 times (point (5)) because 10×(960/480)=20.

Figure 7:
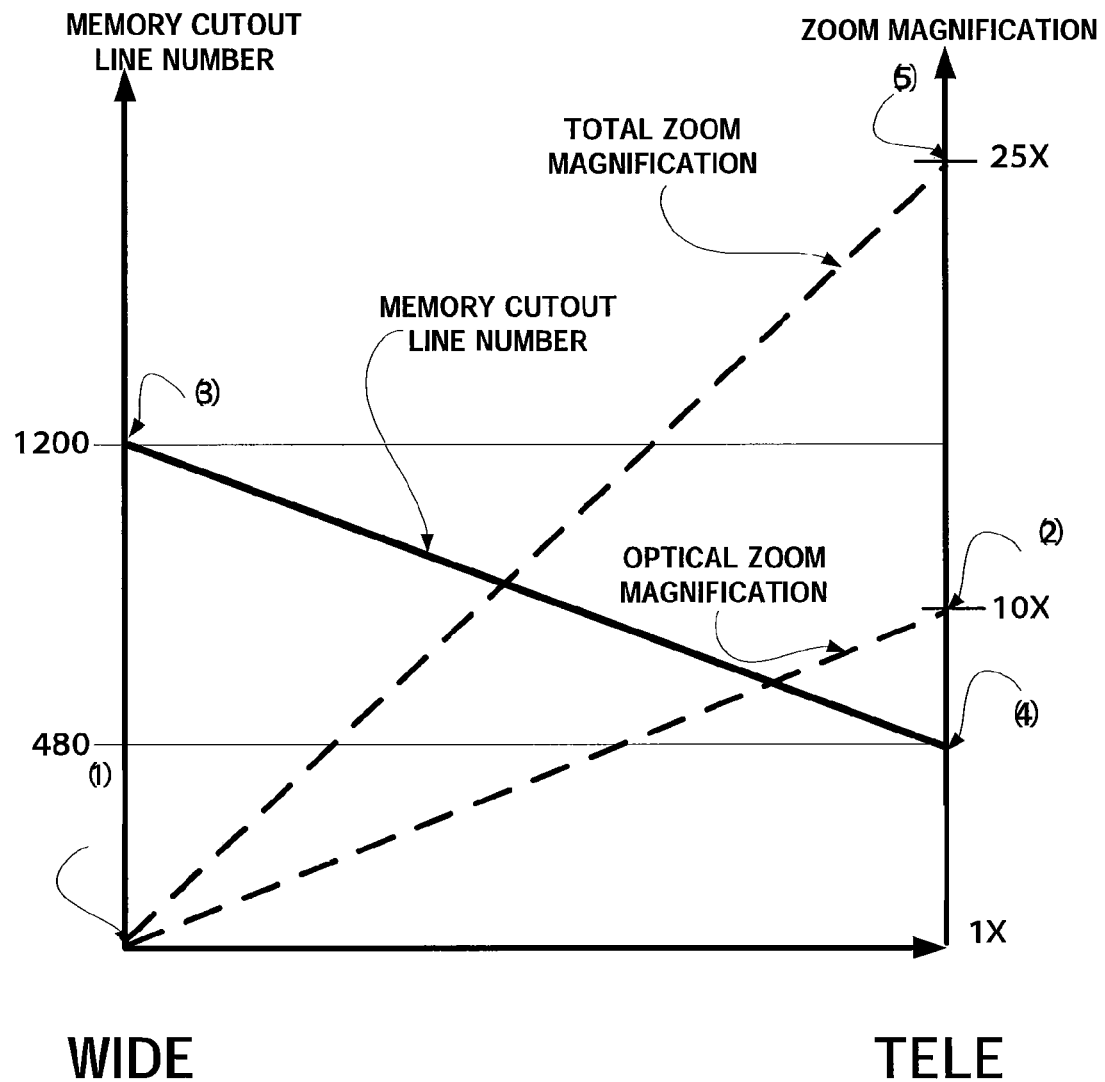
FIG. 7 is a view showing zooming with an imaging aspect ratio of 4:3 in a conventional video camera.

FIG. 7 shows zooming in the conventional video camera where the imaging aspect ratio is 4:3. In FIG. 7, similar to FIG. 6, the abscissa axis denotes the zoom position, the left and right ordinate axes denote the zoom magnifications. The optical zoom magnification is variable between once and 10 times. In addition, the electronic zoom magnification is variable from a magnification corresponding to 1200 memory cutout lines and a magnification corresponding to 480 memory cutout lines.

Also in FIG. 7, the dotted line connecting points (1) and (2) denotes changes of the optical zoom magnification, and the solid line connecting points (3) and (4) denotes changes of the memory cutout line number.

In zooming from the wide-angle end to the telephoto side, the optical zoom magnification gradually increases from the point (1) at the wide-angle end, and reaches the point (2) at the telephoto end. On the other hand, the memory cutout line number gradually decreases from the point (3) corresponding to 1200 lines to the point (4) corresponding to 480 lines at the telephoto end. Thus, even when the imaging aspect ratio is 4:3 in the conventional video camera, the electronic zoom magnification linearly changes with a change of the optical zoom magnification in the whole zoom region from the wide-angle end to the telephoto end. The maximum memory cutout line number is 1200, and the minimum memory cutout line number is 480, and the electronic zoom magnification changes between once and 2.5 times. In addition, since the maximum optical zoom magnification is 10 times, the total maximum zoom magnification is 25 times (point (5)) because 10×(1200/480)=25.

Next follows a description of a problem that occurs with zooming where the imaging aspect ratio is 4:3, in the conventional video camera described with reference to FIG. 7.

Usually, a wider image stabilization requirement range is needed as a zoom magnification becomes higher. In this respect, since a cutout range becomes narrower as a zoom magnification becomes higher and the maximum position of the image stabilization requirement range is fixed in the zooming shown in FIG. 6, the image stabilization requiring range consequently becomes wider to the size of the cutout range.

As described with reference to FIG. 4, the maximum cutout range is set such that the image stabilization available range has a sufficient width where the imaging aspect ratio is 4:3. Therefore, so as to secure the minimum necessary image stabilization available range, the maximum cutout range may be maintained so that the magnification can improve not only for the wide-angle end but also for the middle zoom position. Nevertheless, when the electronic zoom magnification or the memory cutout size is linearly changed with a change of the optical zoom magnification as shown in FIG. 7, the number of available pixels used to generate the output image in the middle zoom region decreases and the image quality lowers.

Figure 8:
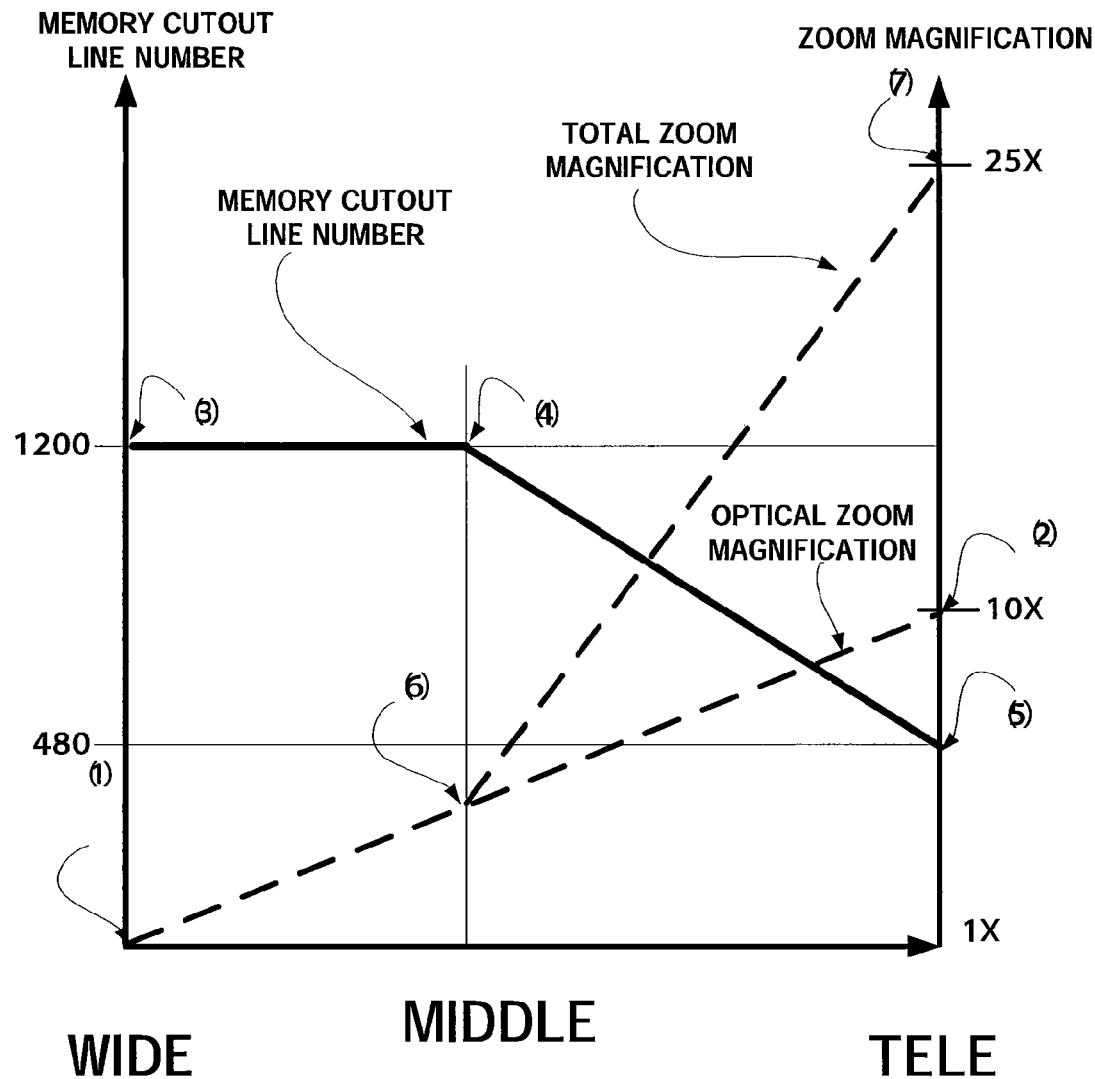
FIG. 8 is a view showing zooming with the imaging aspect ratio of 4:3 according to the embodiment.

In order to solve a problem of the degradation of the image quality in the middle zoom region in the electronic zooming from the wide-angle end to the middle zoom position, this embodiment performs zooming as shown in FIG. 8, where the imaging aspect ratio is 4:3.

In FIG. 8, the abscissa axis denotes the zoom position, and the left and right ordinate axes denote the zoom magnifications, similar to FIG. 6. The optical zoom magnification is variable from once to 10 times. In addition, the electronic zoom magnification is variable from a magnification corresponding to 1200 memory cutout lines and a magnification corresponding to 480 memory cutout lines.

The dotted lines connecting points (1) and (2) denotes changes of the optical zoom magnifications, and the solid line connecting points (3)-(4)-(5) denotes changes of the memory cutout line number.

In zooming from the wide-angle end to the telephoto end, the optical zoom magnification gradually increases from the point (1) as the wide-angle end, and reaches the point (2) as the telephoto end. This optical zooming is the same as that shown in FIG. 7.

On the other hand, the memory cutout line number does not change from the point (3) as the wide-angle end to the middle zoom position (MIDDLE) (4), and maintains the maximum line number (1200 lines). In other words, no electronic zooming is performed along with the optical zooming from the wide-angle end to the middle zoom position. The middle zoom position is a zoom position at which the image stabilization requirement range is maintained and the maximum zoom magnification is obtained even when the maximum cutout range is set. Thus, the output image can maintain a good image quality by maintaining the maximum cutout range from the widen-angle end to the middle zoom position, and thereby securing the image stabilization performance.

Then, the memory cutout line number gradually decreases from the middle zoom position (4) to the telephoto end, and reaches the point (5) at the telephoto end.

The dotted line connecting points (1)-(6)-(7) denotes the total zoom magnification. The total zoom magnification from the point (1) at the wide-angle end to the point (6) at the middle zoom position is the same as the optical zoom magnification. On the other hand, as the position approaches to the point (7) at the telephoto end from the point (6) at the middle zoom position, the electronic zoom magnification increases with the optical zoom magnification, and the total zoom magnification at the telephoto end becomes 25 times that is the same as that shown in FIG. 7.

Thus, this embodiment performs the electronic zooming along with the optical zooming in the whole zoom region where the imaging aspect ratio is 16:9. On the other hand, when the imaging aspect ratio is 4:3, only the optical zooming is performed without performing the electronic zooming from the wide-angle end to the middle zoom position, and the electronic zooming is performed along with the optical zooming from the middle zoom position to the telephoto end. In other words, the degradation of the image quality in the middle zoom region can be restrained while a high total zoom magnification is obtained, by switching the zoom range for the electronic zooming according to the imaging aspect ratio.

The microcomputer 7 stores in its internal memory data of the memory cutout line numbers corresponding to the optical zoom positions shown in FIGS. 6 and 8.

Figure 9:
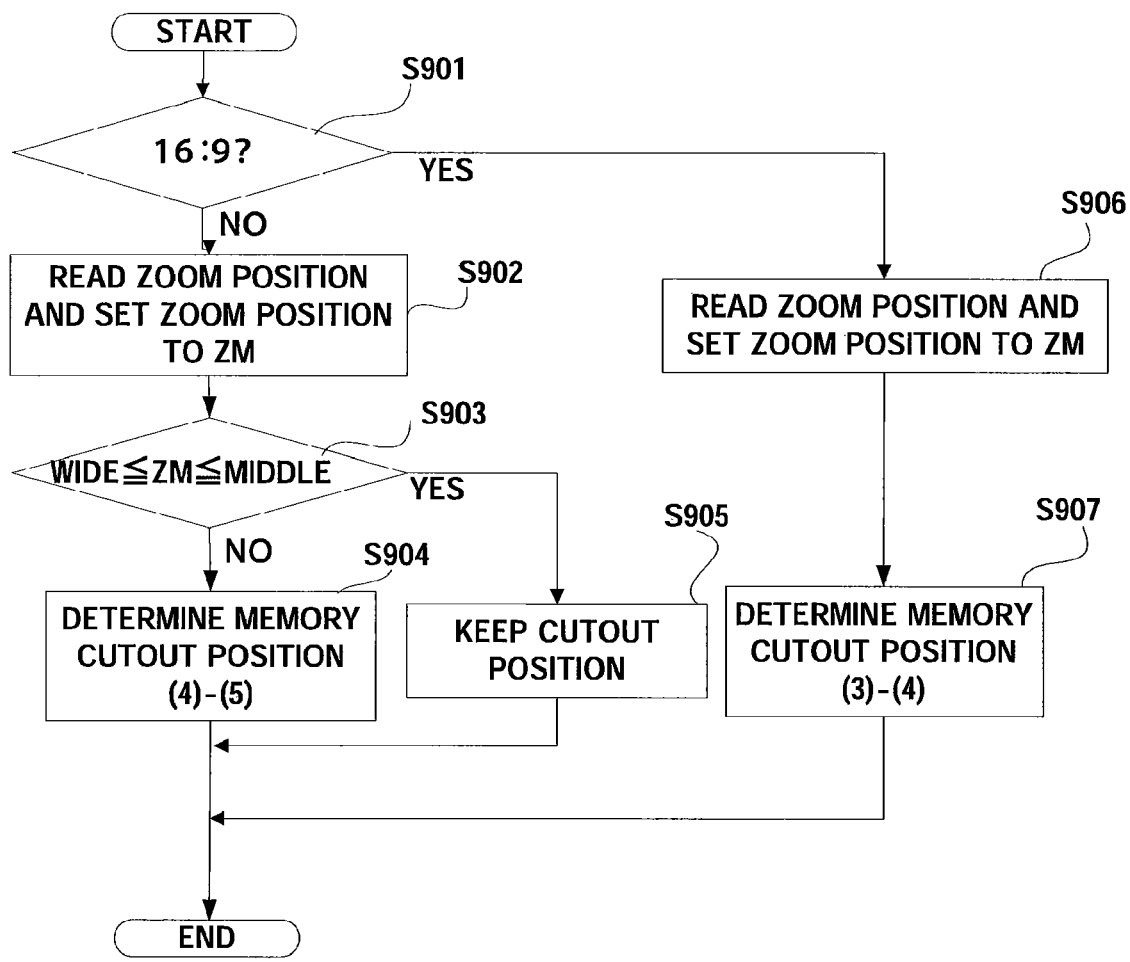
FIG. 9 is a flowchart showing an electronic zoom control according to the embodiment.

The flowchart shown in FIG. 9 shows a control procedure (zoom control method) of the electronic zooming in the microcomputer 7.

In the step S901, the microcomputer 7 determines (checks) whether the aspect ratio switch 10 has selected 16:9 or 4:3 as the imaging aspect ratio. When 4:3 is selected in the step S902, the microcomputer 7 reads the optical zoom position and sets the read optical zoom position to ZM, and the flow proceeds to the step S903.

The microcomputer 7 in the S903 determines whether the optical zoom position ZM is located at a position between the wide-angle end and the middle zoom position shown in FIG. 8. When the optical zoom position ZM is located between the wide-angle end and the middle zoom position, the flow proceeds to the step S905. The microcomputer 7 in the step S905 maintains the memory cutout line number to be 1200 lines. Thereby, no electronic zooming is performed even when the optical zooming is performed between the wide-angle end and the middle zoom position.

In addition, when the optical zoom position ZM is not located at the position between the wide-angle end and the middle zoom position (but located at a position between the middle zoom position and the telephoto end), the flow proceeds to the step S904. In the step S904, the microcomputer 7 sets the memory cutout line number (reduction ratio) corresponding to the optical zoom position ZM among the memory cutout line number between the points (4) and (5) shown in FIG. 8, and outputs it to the reduction processing circuit 4.

More specifically, the microcomputer 7 reads out the memory cutout line number corresponding to the optical zoom position ZM from data of the memory cutout line number shown in FIG. 8 stored in the internal memory. However, the microcomputer 7 may use an operational equation and calculate the memory cutout line number corresponding to the optical zoom position ZM. When the optical zooming is performed between the middle zoom position and the telephoto end, the electronic zooming is performed accordingly.

In addition, the flow proceeds to the step S906 when the 16:9 is selected in the step 901. In the step S906, the microcomputer 7 reads the optical zoom position, and sets the read optical zoom position to ZM. In the step S907, the microcomputer 7 sets the memory cutout line number (reduction ratio) corresponding to the optical zoom position among the memory cutout line number between the points (3) and (4) shown in FIG. 6, and outputs it to the reduction processing circuit 4. Thereby, when the optical zooming is performed between the wide-angle end and the telephoto end, the electronic zooming is performed accordingly.

As described above, this embodiment combines the optical zooming with the electronic zooming, and can obtain a high zoom magnification that is unavailable only with the optical zooming. In addition, in the wide-angle side zoom region, photographing at a wide angle of view is available while the image stabilization performance is secured, and a good image quality is available at any zoom magnifications irrespective of the imaging aspect ratio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, this embodiment describes with numerical values, such as 480 lines and 1200 lines, for the pixel line number corresponding to the minimum cutout size and the maximum readout line number of the CCD sensor pursuant to the NTSC standard, but these numerical values are merely illustrative and other numerical values may be employed. In addition, the pixel line number corresponding to the minimum cutout size may be lower than 480 lines.

In addition, this embodiment discusses the linear electronic zooming in the whole zoom region from the wide-angle end to the telephoto end, where the imaging aspect ratio is 16:9. However, nonlinear electronic zooming may be performed or a zoom region that does not accompany with the electronic zooming may be included.

Moreover, this embodiment sets the imaging aspect ratio of 16:9 to the first aspect ratio and the imaging aspect ratio of 4:3 to the second aspect ratio, but these values may be set reversely. In addition, the aspect ratios of 16:9 and 4:3 are merely illustrative, and other aspect ratios may be employed.

Although this embodiment discusses the CCD sensor that serves as the image sensor 2, another photoelectric conversion element, such as a CMOS sensor, may be used. In using the CMOS sensor, the electronic zooming may be performed similar to a change of the cutout area from the input image that is described in this embodiment by changing a size of the readout range of a signal from the CMOS sensor.

This application claims the benefit of Japanese Patent Application No. 2007-338412, filed on Dec. 28, 2007, which is hereby incorporated by reference herein in its entirety.

What is claimed is:

1. An image pickup apparatus comprising:
   an optical zooming unit configured to provide an optical magnification variation;
   an image sensor including an effective pixel area which has an aspect ratio of 4:3 and configured to convert an optical image into an electronic signal;
   an electronic zooming unit configured to provide an electronic magnification variation using a signal from the image sensor without enlarging with an interpolating process;
   a controller configured to control an operation of the electronic zooming unit; and
   a selector configured to select an aspect ratio of an output image between an aspect ratio of 16:9 and an aspect ratio of 4:3,
   wherein when the aspect ratio of 16:9 is selected, the controller operates the electronic zooming unit along with an operation of the optical zooming unit in a first area, and
   wherein when the aspect ratio of 4:3 is selected, the controller operates the electronic zooming unit along with the operation of the optical zooming unit in a second area,
   wherein the first area is between a first zoom state and a second zoom state that is closer to a telephoto end than the first zoom state, and the second area is between the second zoom state and the third zoom state that is located between the first zoom state and the second zoom state.

2. An image pickup apparatus according to claim 1, wherein the electronic zooming unit provides the electronic magnification variation by changing a size of a first range that is one of a cutout range from an input image generated by using the signal from the image sensor and a readout range from the image sensor.

3. An image pickup apparatus according to claim 2, further comprising an image stabilization unit configured to provide an electronic image stabilization process by shifting the first range,
   wherein the electronic zooming unit sets the first range so that a second range that enables the first range to be shifted can be left outside of the first range, and
   wherein the size of the first range and a size of the second range are fixed between the first zoom state and the third zoom state, and the size of the second range increases when the size of the first range decreases from the third zoom state to the second zoom state.

4. A zoom control method for an image pickup apparatus that includes an optical zooming unit configured to provide an optical magnification variation, an image sensor including an effective pixel area which has an aspect ratio of 4:3 and configured to convert an optical image into an electronic signal, an electronic zooming unit configured to provide an electronic magnification variation using a signal from the image sensor without enlarging with an interpolating process, and a selector configured to select an aspect ratio of an output image between an aspect ratio of 16:9 and an aspect ratio of 4:3, said zoom control method comprising the steps of:
   detecting the aspect ratio selected by the selector;
   operating, when the aspect ratio of 16:9 is selected, the controller operates the electronic zooming unit along with an operation of the optical zooming unit in a first area; and
   stopping operating, when the second aspect ratio is selected, the controller operates the electronic zooming unit along with the operation of the optical zooming unit in a second area,
   wherein the first area is between a first zoom state and a second zoom state that is closer to a telephoto end than the first zoom state, and the second area is between the second zoom state and the third zoom state that is located between the first zoom state and the second zoom state.

* * * * *